(12) United States Patent
Huber et al.

(10) Patent No.: US 7,021,171 B2
(45) Date of Patent: Apr. 4, 2006

(54) ANNULUS GEAR AND DRIVE SHELL

(75) Inventors: David P. Huber, Millbury, OH (US);
Ben R. Vasa, Lapeer, MI (US);
Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 0 days.

(21) Appl. No.: 10/683,370

(22) Filed: Oct. 10, 2003

(65) Prior Publication Data

US 2004/0074327 A1    Apr. 22, 2004

Related U.S. Application Data

(63) Continuation of application No. PCT/US03/03804, filed on Feb. 10, 2003.

(60) Provisional application No. 60/361,993, filed on Mar. 5, 2002.

(51) Int. Cl.
*F16H 1/28* (2006.01)

(52) U.S. Cl. .............. 74/431; 74/439; 72/347; 72/208

(58) Field of Classification Search ......... 74/431, 74/457, 462, 439, 443, 438, 446; 29/893, 29/893.3, 893.32, 893.35, 893.33; 72/335, 72/336, 347, 348, 355.2, 355.4, 80, 82, 83, 72/84, 208; 464/183; 403/359.1, 359.5; 475/317, 318, 331

See application file for complete search history.

(56) References Cited

U.S. PATENT DOCUMENTS

| | | | |
|---|---|---|---|
| 338,961 A | | 3/1886 | Hart |
| 2,558,840 A | * | 7/1951 | Gordon ................ 123/179.31 |
| 2,704,882 A | | 3/1955 | Olson |
| 3,100,333 A | * | 8/1963 | Friend ...................... 29/893.1 |
| 3,722,076 A | | 3/1973 | Dent |
| 3,922,932 A | * | 12/1975 | Maurice et al. ............. 475/284 |
| 3,982,415 A | | 9/1976 | Killop |
| 4,056,291 A | * | 11/1977 | Kraft et al. ................. 384/537 |
| 4,074,583 A | | 2/1978 | Hansson |
| 4,376,333 A | * | 3/1983 | Kanamaru et al. ............ 29/432 |
| 4,807,351 A | | 2/1989 | Berg et al. |
| 4,856,166 A | | 8/1989 | Miwa |
| 4,876,876 A | * | 10/1989 | Ishida et al. .................. 72/348 |
| 5,272,930 A | | 12/1993 | Nakamura et al. |
| 5,384,949 A | * | 1/1995 | Wodrich et al. .............. 29/557 |
| 5,397,282 A | * | 3/1995 | Weidman .................... 475/205 |

(Continued)

FOREIGN PATENT DOCUMENTS

JP    11-70293    *  3/1999

*Primary Examiner*—William C. Joyce
(74) *Attorney, Agent, or Firm*—Fraser Martin & Miller LLC; Donald R. Fraser

(57) ABSTRACT

A method of producing a torque transmission between a driving member and a driven member including the steps of capturing an annular gear within the interior of a hollow cylindrical shell formed of a formable material which is caused to be flow formed around a portion of the exterior of the gear to militate against any relative longitudinal and axial movement between the shell and the gear.

3 Claims, 2 Drawing Sheets

U.S. PATENT DOCUMENTS

| | | | |
|---|---|---|---|
| 5,706,694 A * | 1/1998 | Bhookmohan et al. | 72/325 |
| 5,732,586 A * | 3/1998 | Muessig et al. | 72/267 |
| 5,927,121 A | 7/1999 | Rolf et al. | |
| 5,928,104 A * | 7/1999 | Kimura et al. | 475/318 |
| 5,951,794 A | 9/1999 | Dickson, Jr. | |
| 5,992,597 A * | 11/1999 | Nagai et al. | 192/85 AA |
| 6,035,737 A | 3/2000 | Prater | |
| 6,061,907 A * | 5/2000 | Victoria et al. | 29/893.1 |
| 6,074,323 A * | 6/2000 | Collins et al. | 475/331 |
| 6,233,999 B1 * | 5/2001 | Yabutani et al. | 72/354.8 |

* cited by examiner

ANNULUS GEAR AND DRIVE SHELL

This application is a continuation of international application No. PCT US03/03804, filed Feb. 10, 2003, (pending).

This application claims the benefit of U.S. Provisional Patent Application Ser. No. 60/361,993, filed Mar. 5, 2002.

BACKGROUND OF THE INVENTION

1. Field of the Invention

The present invention relates to a torque transmission system and more particularly to an apparatus for transmitting torque between an annulus gear and a drive shell having a splined portion and a method for producing the same.

2. Description of the Prior Art

In planetary automatic transmission systems, torque is transmitted from component to component within the transmission. Frequently, these components are of complex design, permitting them to serve several functions and reduce the number of components in the assembly. In such a case, the material from which the component is made is usually selected to accommodate the greatest stresses applied to this complex component. A large portion of such a component is stronger and heavier than is really necessary for the application.

In order to reduce weight, aluminum is used in place of steel where possible. Aluminum is not an appropriate material for such components as annulus gears, but it can be used for drive shells which transmit the torque between annulus gears and other supporting or torque-controlling structures within the transmission. A current version of a system which the present invention can be applied uses an annulus gear with a drive spline on its face, an aluminum drive shell with a bore to locate the annulus gear and pockets to receive the drive spline teeth, and a snap ring to retain the annulus gear within the aluminum drive shell. The aluminum component is cast and is subject to the porosities and imbalance problems common to cast components.

It is an object of the present invention to produce a torque transmission system which is light in weight and relatively inexpensive to manufacture.

Another object of the invention is to produce a torque transmission system including an annulus gear and an associated drive shell containing the gear which may be readily manufactured.

SUMMARY OF THE INVENTION

The above and other objects of the invention may be achieved by the production of a torque transmission system between a driving member and a driven member comprising the steps of:

providing a hollow cylindrical shell having spaced apart ends and a longitudinal axis;

forming a coaxial splined section adjacent one end of the shell for engagement with one of the members to transmit torque therebetween;

placing an annulus gear with internal spines formed or cut on the interior surface thereof coaxially within the hollow cylindrical shell between the spaced apart end thereof; and capturing the annulus gear within the shell to enable torque transmission between the gear and the shell.

BRIEF DESCRIPTION OF THE DRAWINGS

The above objects and advantages of the invention will become readily apparent to those skilled in the art from reading the following detailed description of the invention when considered in the light of the accompanying drawings, in which.

DETAILED DESCRIPTION OF THE PREFERRED EMBODIMENT

Figure 1:
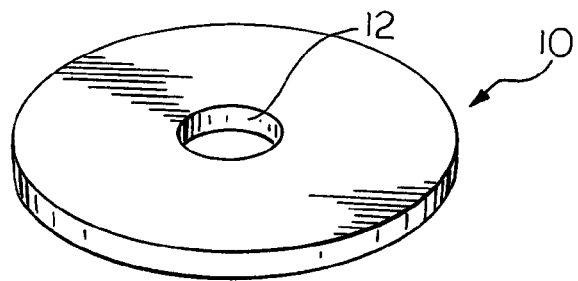
FIG. 1 is a perspective view of a blank used to form the drive shell of the invention.

The torque transmission system of the invention is typically produced by the following method wherein the first step includes the provision of a blank 10 as illustrated in FIG. 1. The blank 10, sometimes referred to as a slug, is formed of a formable metal such as a 6000 series aluminum of a thickness of eight to nine millimeter in the preferred embodiment. The blank 10 is provided with a centrally formed aperture 12.

Figure 2:
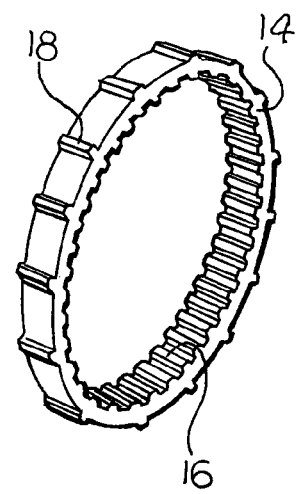
FIG. 2 is a perspective view of the annular gear to be integrated with the blank illustrated in FIG. 1.
Figure 4:
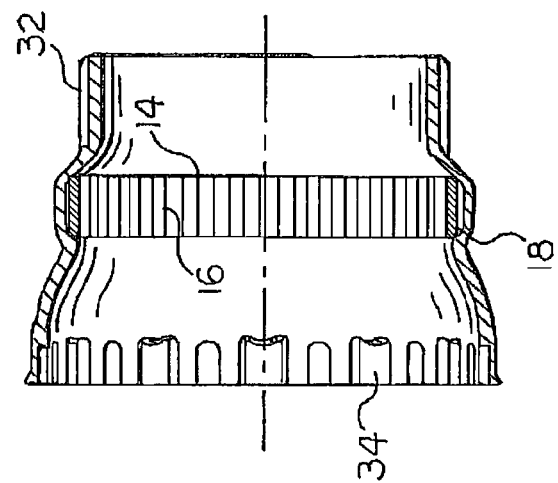
FIG. 4 is a sectional view of the completed torque transmission product produced by the novel method of the invention.

FIG. 2 illustrates an annular gear 14 is integral to the invention as will become manifest hereinafter. The annular gear 14 is typically produced from a steel stock material and is provided with internally formed teeth 16 which extend radially inwardly of the annulus. The outer peripheral wall of the annulus is provided with outwardly projecting surface modifications 18.

Figure 3:
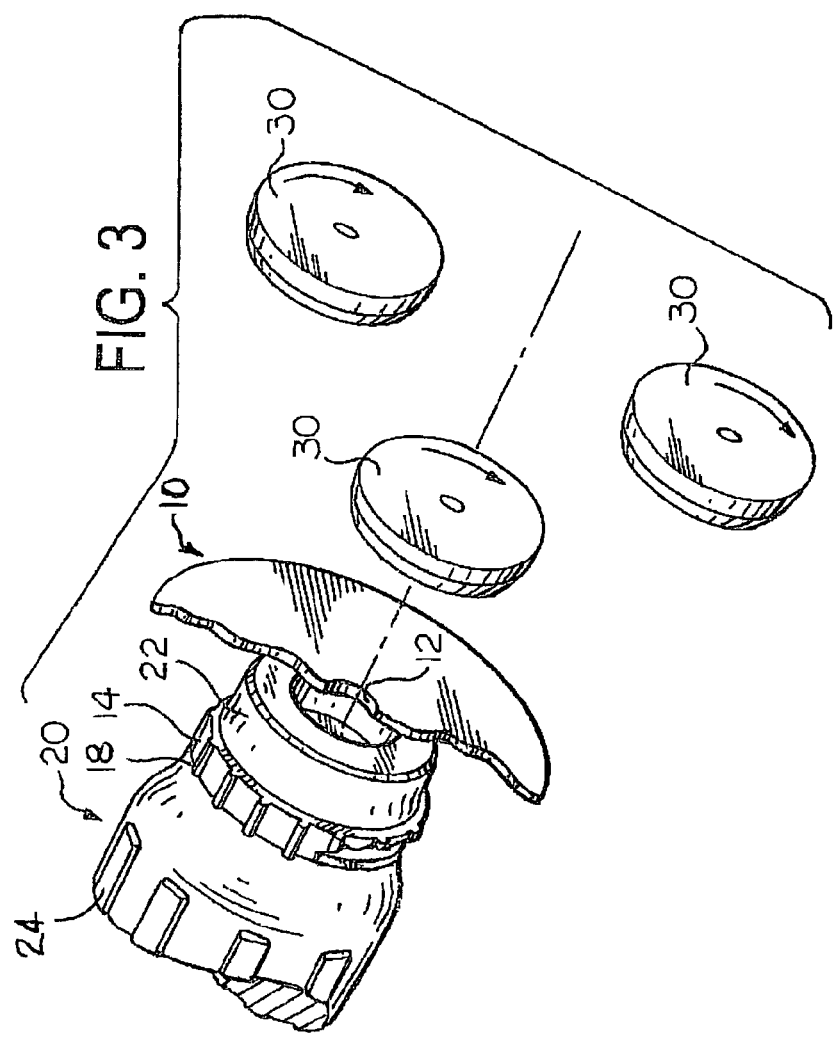
FIG. 3 is a perspective view of the forming rollers and mandrel used to form the finished torque transmission products.

In order to form an integral assembly of the blank 10 and the annulus gear 14, there is provided a rotating mandrel 20; illustrated in FIG. 3. The gear 14 is adapted to be received within a suitably formed shelf on the outer peripheral surface of the mandrel 20. The mandrel 20 is typically provided with a clamping mechanism effective to hold the blank 10 on the mandrel end.

The outer peripheral surface of the mandrel 20 is provided with a contour necessary to effect the shape of the blank 10 into the desired completed shape. More specifically, the one end of the mandrel 20 adjacent the blank 10 is provided with an array of splines 22 which project outwardly. The other end of the mandrel 20 is contoured lugs 24. Intermediate the opposite end of the mandrel 20, the central portion is generally smooth with the exception of the gear receiving shelf alluded to earlier in the description.

After the blank 10 is suitably affixed to the one end of the mandrel 20, an assembly of forming rollers 30 is caused to move axially causing the metal stock of the blank 10 to be formed in a generally cup-shape over the mandrel 20. Such relative movement between the rotating mandrel 20 and the rotatable forming rollers 30 causes the metal of the blank 10 to flow and thereby conform to the contour of the outer surface of the mandrel 20. Simultaneously with the above action, the metal of the blank 10 flows over the one end to form outwardly projecting splines 32, and subsequently the material of the blank 10 flows to capture the gear annulus 14 by flowing around the surface modification 18 formed on the outer peripheral surface of the gear, thereby forming cavities for receiving respective ones of the surface modifications 18, causing the gear annulus to be tightly captured and refrained from any relative movement with the outer shell being flow formed by the interaction between the rotating mandrel 20 and the forming rollers 30.

Finally, the circumferentially outermost marginal portion of the blank 10 is caused to flow into and around the lugs 24 on the mandrel 20 to form the illustrated locking lug configuration 34 on the completed part for receiving a cover, for example, for the end of a driving shaft, the extreme end of which has externally projecting splines adapted to engage with the internally projecting teeth 16 of the captured gear 14.

It will be understood that the assembly of the forming rollers 30 is adapted to move axially of the mandrel 20 until the blank 10 is formed into a completed part. During the relative movement of the mandrel 20 and the blank 10, and the assembly of forming rollers 30, the thickness of the metal of the blank 10 is reduced as much as twenty-five percent (25%).

The cooperation between the inner surface of the formed blank 10 and the radially outwardly projecting surface modifications 18 provide the ability of the system to transmit torque between the formed blank 10 and the annulus gear 14.

It will be appreciated that the flow forming of the material of the blank 10 along the outer surface of the annulus gear 14 adequately retains the gear 14 from any relative rotation movement in respect of the shell 12 as well as militates against relative axial movement therebetween. Such structure thereby eliminates the necessity of a retaining ring, for example, and results in a reduction of cost of materials, as well as the cost of machining.

It has been discovered that aluminum is the preferred metal for forming the drive shell 12 although it must be understood that other metals such as, for example, steel may likewise be used.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An annulus gear and drive shell product for transmitting torque between a driving member and a driven member comprising:
   a drive shell formed of a malleable metal having a longitudinal axis and a cylindrical body with spaced apart coaxial ends, one of the ends adapted to be coupled to said driving member and the other end adapted to be coupled to said driven member and having at least one radially extending cavity formed between said coaxial ends; and
   an annular gear provided with radially inwardly projecting teeth disposed coaxially within the interior of the cylindrical body of said drive shell and having at least one outwardly projecting surface modification received within the cavity of said drive shell to prevent relative movement between said annular gear and said drive shell; and wherein the drive shell is formed around the annular gear to prevent relative movement between the annular gear and the drive shell.

2. The product defined in claim 1 wherein the formable metal of said drive shell is aluminum.

3. The product defined in claim 1 wherein the formable metal of said drive shell is steel.

* * * * *